Dec. 2, 1958  S. R. STILES  2,862,791
SULFURIC ACID PURIFICATION
Filed July 8, 1955
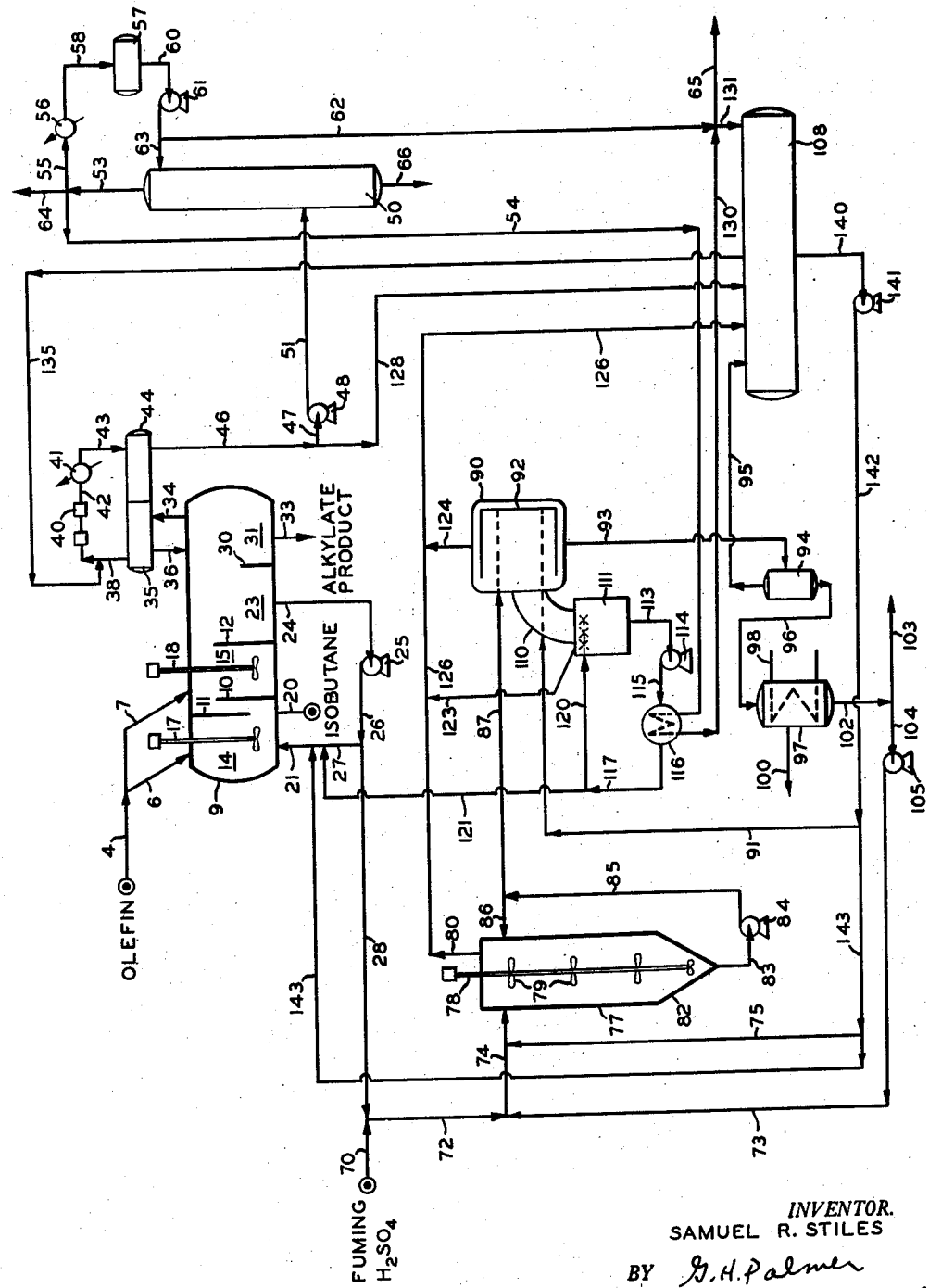
INVENTOR.
SAMUEL R. STILES
BY G. H. Palmer
Cruzan Alexander
ATTORNEYS

2,862,791

SULFURIC ACID PURIFICATION

Samuel R. Stiles, Cresskill, N. J., assignor to The M. W. Kellogg Company, Jersey City, N. J., a corporation of Delaware Application July 8, 1955, Serial No. 520,682

9 Claims. (Cl. 23—172)

This invention relates to an improved method for the purification of sulfuric acid and, more particularly, it pertains to an improved method for the purification of spent sulfuric acid from an alkylation process whereby substantially greater yield of purified acid is obtained.

Sulfuric acid containing polar and non-polar impurities, with or without water, is purified by subjecting the material to a subatmospheric temperature sufficient to produce sulfuric acid crystals of high purity and there remains an uncrystallized mass, commonly referred to as the "mother liquor." The mother liquor contains, in substantial quantities, the polar and non-polar impurities. Consequently, it is rejected from the system or it is treated for the removal of polar and non-polar impurities through extraction. In any event, the cost of further recovering acid from the mother liquor is expensive and, as a consequence, there has been little incentive for utilization of the mother liquor to recover additional quantities of acid therefrom. By means of the present invention, an improved method is proposed for the recovery of additional quantities of sulfuric acid from the mother liquor.

An object of this invention is to provide an improved method for purifying sulfuric acid containing non-polar impurities, with or without polar impurities.

Another object of this invention is to provide an improved method for the purification of sulfuric acid involving the crystallization technique whereby a substantial increase in yield of purified acid is obtained through processing of the mother liquor.

Other objects and advantages of this invention will become apparent from the following description and example thereof.

In accordance with this invention, a process is provided which comprises subjecting sulfuric acid containing non-polar impurities to a crystallization temperature to produce sulfuric acid crystals and mother liquor, separating the acid crystals from mother liquor and then allowing mother liquor to stand until two substantially immiscible liquid phases or layers are formed. One layer formed is a lower acid rich phase and the other is an upper non-polar impurity rich phase. By reason that a phase or layer of non-polar material is formed, the immiscible acid phase has a greater concentration of free acid than it did following the separation of acid crystals therefrom. Consequently, the acid material is suitable as recycle material to the crystallization zone for additional recovery of sulfuric acid. In order to prevent an undue accumulation of undesirable impurity materials in the acid phase, it is proposed by means of the present invention that a portion thereof be rejected from the system, however, it should be understood that the rejection of acid may not be necessary in some instances, because the separation of the non-polar phase from the mother liquor takes place to a significant extent and, therefore, there is no undue accumulation of impurities in the acid being recycled to the crystallization zone.

In another aspect of this invention, a method is provided which comprises subjecting sulfuric acid containing non-polar impurities to a crystallization temperature in the presence of an organic or inorganic liquid spacer which is immiscible and non-reactive with the sulfuric acid and does not solidify at crystallization temperatures thereby producing sulfuric acid crystals and mother liquor, separating the acid crystals from the mother liquor and organic or inorganic liquid spacer, separating the mother liquor from the organic or inorganic liquid spacer and allowing the mother liquor to stand until a layer of non-polar material is formed. As previously indicated, when the mother liquor is allowed to stand there is formed a non-polar layer and an acid phase of increased free acid strength. By virtue of the increase in free acid strength, the acid phase is a suitable material for recycle to the crystallization zone for additional recovery of sulfuric acid.

In regard to the utility of this invention, it should be noted that the purification technique can be applied to sulfuric acid containing non-polar impurities, with or without polar impurities, as well as water. For the purpose of this specification and the appended claims, water will be treated as a separate impurity. The present application is applicable to sulfuric acid contaminated with non-polar impurities, notwithstanding the total acidity of the spent acid. The total acidity is expressed as $H_2SO_4$. Since the invention can be used for the purification of sulfuric acid material substantially free of water or one containing water in varying quantities, the crystallization conditions can be controlled to produce sulfuric acid containing water of a desired eutectic composition. This invention also applies to a method of purifying spent acid to maintain a minimum concentration of impurities. More usually, the present invention is adapted to the purification of spent sulfuric acid containing at least 80% total acidity, preferably at least 90% on the same basis. Such spent acids can be derived, for example, from an alkylation process in which an olefin and an isoparaffin are reacted in the presence of sulfuric acid. Further, the spent acid can be obtained from an operation in which a gasoline, furnace oil or lubricating oil is treated for the removal of olefinic or diolefinic compounds, without sulfur removal by means of sulfuric acid. The non-polar impurity in the spent acid can be, for example, hydrocarbons, dialkyl esters of sulfuric acid, etc.; whereas the polar impurities are, for example, the acid esters of sulfuric acid or mono-alkyl sulfates, etc. The contaminated acid can contain about 0% to about 25% of non-polar impurities, about 0% to about 25% of polar impurities and about 0 to about 7% of water, based on the total weight of the acid. The high values are typical of cold temperature conditions, e. g., $-35°$ F., and at warmer temperatures, these values change with the quantity of polar impurities decreasing and the quantity of non-polar impurities increasing. In regard to spent sulfuric acid from an alkylation process, it is found that the spent acid usually contains about 0 to about 10% of non-polar impurities, about 0 to about 10% of polar impurities and about 0 to about 7% of water. More usually, the spent acid contains about 0.1 to 8% non-polar impurities, based on the weight of the acid.

For the purification treatment, the contaminated sulfuric acid is subjected to a temperature of about $-100°$ to about $50°$ F. In the case where sulfuric acid is crystallized in the absence of an inorganic or organic liquid spacer, it is preferred that the crystallization temperature be maintained at about $0°$ to about $35°$ F.; whereas when the sulfuric acid is crystallized in the presence of the organic or inorganic liquid spacer, the temperature is preferably about −40° to about 0° F. The selection of a crystallization temperature depends upon the type and quantity of impurities present. The temperature selected will generally be that resulting in maximum crystal yield with minimum impurities. Lower temperatures generally favor larger yields of acid crystals, however, there may be an adverse effect due to the increase in the viscosity of the mother liquor at these lower temperatures. In relation to the operation involving the crystallization of the acid in the presence of a spacer material, it is found that the spacer liquid tends to overcome any effects due to the increase in viscosity of the mother liquor. The pressure of the crystallization step can be varied within a wide range, namely, subatmospheric, atmospheric or superatmospheric, although it is preferably about 10 p. s. i. a. to about 25 p. s. i. a. Where a liquid spacer is employed, it can also serve as an auto-refrigerant. The organic or inorganic liquid spacer is volatilizable under the pressure and temperature conditions present in the crystallization zone, hence the necessary cooling is effected.

In the crystallization of acid involving the organic or inorganic liquid spacer, the spacer material selected for this purpose should be preferably non-reactive with the sulfuric acid and immiscible therewith. Further, the organic or inorganic liquid spacer should remain as a liquid at the temperature of crystallization without becoming unduly viscous and therefore tending to create problems with respect to the separation of spacer material from the crystals of acid. In a preferred aspect, the organic or inorganic liquid spacer is miscible with the impurities in the sulfuric acid, however, for the purpose of this invention, this characteristic of the spacer is not essential by reason that the non-polar impurities can be separated to a substantial extent as part of the mother liquor following the separation of crystals therefrom. The organic liquid spacer can be, for example, a hydrocarbon, halogenated aliphatic hydrocarbons, halocarbons, aliphatic esters, etc., and the inorganic liquid is, for example, an oxide of sulfur, viz., $SO_2$. For the purpose of this invention, where the spent acid is derived from a treatment involving a hydrocarbon or petroleum fraction, it is preferred that the organic liquid spacer be a light aliphatic hydrocarbon containing about 1 to about 7 carbon atoms or mixtures thereof. In relation to the liquid spacer being used as an auto-refrigerant, the spacer is a volatilizable liquid which can be vaporized or volatilized under crystallization conditions to maintain the desired crystallization temperature. The volatilizable liquid can be any one or more of the spacer liquids described above, provided that the material is vaporized under crystallization conditions to produce the desired temperature. In this respect, the light paraffins containing about 1 to 6 carbon atoms or mixtures thereof are preferred for this purpose by reason that such materials are readily available and non-reactive with sulfuric acid as well as being immiscible. Specific examples of the light paraffins are methane, ethane, propane, n-butane, isobutane, n-pentane, isopentane, hexane, etc. By using the organic liquid spacer in the crystallization zone, the adverse effect arising from the high viscosity of the mother liquor is averted to a large extent at the low temperature obtaining within the crystallization zone. The quantity of liquid spacer which is employed relative to the sulfuric acid in liquid form, on a volumetric basis, is about 1 to about 1000 parts of spacer per part of acid. More usually, the volumetric ratio is about 10 to about 50 parts of spacer liquid per part of acid.

Following the crystallization step, with or without the use of a liquid spacer, the sulfuric acid crystals can be optionally washed with an organic or inorganic liquid which is preferably miscible with the impurities occluded or sorbed on the surface of the crystals and said organic or inorganic liquid is immiscible with sulfuric acid. The organic liquid to be used for this purpose is of the same general type as specified hereinabove for the spacer material. However, for the same reasons advanced hereinabove, it is preferred to use a paraffinic hydrocarbon as the wash liquid. Where the impurities are of a high molecular weight, it is preferred to employ a high molecular weight hydrocarbon wash liquid, and conversely in the case of low molecular weight impurities. For the purpose of washing, it is preferred to employ gasoline, naptha, kerosene, heater oil or furnace oil as the wash liquid. In the washing step, the temperature should be maintained below the temperature at which the crystals will melt. Consequently, it may be necessary to subject the wash liquid to cooling prior to using the same for the washing operation. Further, during the washing step, it is preferred that turbulent conditions be maintained within the washing apparatus in order to permit the removal of impurities from the acid crystals. The washing operation can be repeated as frequently as is desired, the only limitation being an economical consideration. In general, for the washing step about 1 to about 1000 parts by volume of washing liquid, preferably about 5 to about 25 parts by volume, per part of solid acid crystals are employed.

The sulfuric acid crystals, with or without washing, are separated from the mother liquor, with or without liquid spacer being present. When the liquid spacer is present, it is further separated from the mother liquor and thereafter the mother liquor is warmed, for example, to 30° or 70° F., and permitted to stand until the layer of non-polar material is formed as a supernatant phase. This also applies to the case where the liquid spacer is used for the crystallization step. The mother liquor is permitted to stand in a quiescent zone for a period of about 2 to about 2000 minutes, preferably about 30 to about 60 minutes. For reasons not too clearly understood, a layer of non-polar impurities is formed and the concentration of free acid in the mother liquor increases to a strength approaching the concentration at which the material existed prior to the crystallization treatment. The mother liquor is heated to a temperature of about 0 to about 100° F., although it is preferred to employ a temperature of about 10° to about 70° F. greater than the melting point of the acid crystals. It is desirable to prevent the formation of acid crystals while the mother liquor is standing, because it creates the problem of handling the acid phase containing crystals for recycle to the crystallization zone. On the other hand, the temperature of the mother liquor should not be unduly high above the melting point of the crystals as this may place an undue cooling duty on the crystallization zone or cause over-polymerization of the non-polar product and an excessively high boiling point material. All or a part of the acid phase resulting from the mother liquor standing can be recycled to the crystallization zone. In general, it is desired to maintain a recycle ratio, defined as the volumetric ratio of recycle acid and fresh acid feed to fresh acid feed of about 10 to about 1000:1, preferably about 50 to about 250:1. The non-polar impurities present as a supernatant layer on the acid phase can be readily withdrawn by conventional means, and this material can be utilized for any purpose which appears desirable. In the case of purifying spent sulfuric acid from an alkylation unit, it was unexpectedly found that the non-polar impurity is alkylate product material, consequently, the crystallization process of this invention serves indirectly as a means for recovering additional quantities of alkylate product from the spent acid which is separated from the alkylation product in the alkylation reaction.

Having thus provided a description of my invention, reference will now be had to the accompanying drawing containing a specific illustration thereof.

In the drawing, olefinic feed containing 20% propylene and 80% butylene is fed from source 4 at the rate of 3240 B. P. D., and this stream is divided such that one-half of the same is fed through line 6 and the remaining portion is fed through line 7. These split streams of olefin feed are fed through mixers 17 and 18 of alkylation reactor 9. Alkylation reactor 9 contains baffles 10, 11 and 12 which divide part of the reactor into two reaction zones, namely, 14 and 15. The reactant material in zone 14 is agitated by means of mixer 17; whereas in section 15, the reactant material is agitated by means of stirring mechanism 18. Isoparaffin feed, e. g., isobutane, is fed to section 14 at the rate of 11,600 B. P. D. by means of line 20. Sulfuric acid containing 96% free acid is fed to section 14 at the rate of 1000 B. P. D. by means of line 21. The conditions within sections 14 and 15 are sufficient to effect alkylation of butylene with isobutane and these conditions include a temperature of about 35° F. and a pressure of about 5 p. s. i. g. It should be understood that the conditions and reactant materials employed in this example are merely illustrative, because the present invention is adapted to the alkylation process broadly involving an olefin containing, for example, 3 to 6 carbon atoms and an isoparaffin containing about 4 to about 8 carbon atoms. The relative portions of isoparaffin to olefin at the point of mixing in the stirrer type mixer varies from about 50 to about 5000 mols of the former per mol of the latter. Based on the olefin feed, the sulfuric acid contained in the reaction zone is about 0.3 to about 15 parts by volume per part of olefin charged per hour thereto. The sulfuric acid can have a total acidity ranging from about 90 to about 100%. The reaction can be conducted at a temperature of about 20° to about 100° F. and at a pressure of about 1 atmosphere to about 25 p. s. i. g.

As a result of the conditions in sections 14 and 15 of the alkylation reactor, the total reaction mixture passes over partitioning baffle 12 and enters a settling zone 23. In this settling zone, a final separation of acid from the reaction product is effected. Consequently, the reaction product being lighter, generally exists as the supernatant phase; whereas the acid is the lower phase. The acid is withdrawn from the bottom of section 23 by means of line 24, and it is pumped by means of pump 25 through line 26. A portion of the acid is recycled to the alkylation reactor 9 by means of lines 27 and 21; whereas the remaining portion, namely, about 200 B. P. D. passes through line 28, and it is earmarked for purification in accordance with the technique of the present invention to be discussed hereinafter. The supernatant layer of reaction product passes over baffle 30 from section 23 and enters a surge zone or section 31. The reaction product containing alkylate is discharged from the bottom of section 31 by means of line 33, and it is further processed for the recovery of alkylate in a recovery system (not shown). By virtue of the conditions prevailing in the alkylation reactor 9, part of the hydrocarbon reactant is vaporized in order to maintain the desired temperature therein. The vaporized hydrocarbon is withdrawn overhead from alkylation reactor 9 by means of line 34 and it passes to a separator 35. Any liquid contained in separator 35 is discharged from the bottom thereof through line 36, and it is returned to the alkylation reactor. The vaporized hydrocarbon in separating drum 35 passes from the top thereof through line 38, and then it is compressed to a pressure of about 90 p. s. i. g. by means of compressor 40. Following the compression stage, the compressed hydrocarbon passes from compressor 40 to a cooler or condenser 41 by means of line 42. The condensed hydrocarbon passes from condenser 41 through line 43 which leads to the top of a surge drum 44.

The condensed hydrocarbon is withdrawn from surge drum 44 by means of line 46 and a portion thereof, namely, 4000 B. P. D., is passed through line 47, which leads to pump 48, and thence it is pumped to a depropanizer column 50 by means of line 51. In the depropanizer column the top temperature is maintained at 110° F.; whereas the bottom temperature is maintained at 180° F. The pressure in the top of the tower is 185 p. s. i. g. Propane vapor is discharged from the top of the depropanizer column 50 by means of line 53. A portion of the propane vapor, at the rate of 1225 pounds per hour, is passed from line 53 to line 54 and the utilization of this stream will be discussed hereinafter. 38,000 pounds per hour of propane vapor is passed through line 53 to another line 55, and this material flows to a condenser 56, and thence to a surge drum 57 by means of line 58. The condensed propane in surge drum 57 is discharged from the bottom thereof by means of line 60, and this material is pumped by means of pump 61 such that about 55 B. P. D. are passed through line 62 and utilized in a manner discussed hereinafter; whereas 4400 B. P. D. are recycled to the depropanizer column 50 by means of line 63. The remaining portion of propane vapor is discharged from line 53 at the rate of 4500 pounds per hour through line 64. The net production of propane is yielded from the system by means of line 65. C₄ and heavier hydrocarbons which are present in the feed to the depropanizer column are discharged from the bottom thereof by means of line 66 at the rate of 2950 B. P. D.

For the purification of the spent sulfuric acid from the alkylation system and flowing through line 28, it is desirable to add fuming sulfuric acid thereto in order to reduce the water concentration. Originally, the spent acid contains 2% of water by weight and fuming sulfuric acid is combined with the spent acid by means of line 70 at the rate of 20 B. P. D. in order to reduce the water concentration below about ½% by weight. It should be understood that it is not necessary to reduce the water concentration to zero in order to obtain a reasonable recovery of purified acid. The combined stream of fuming sulfuric acid and spent acid passes through line 72, and then this material is combined with recycled sulfuric acid, to be discussed in greater detail hereinbelow, at the rate of 20 B. P. D., by means of line 73. The combined sulfuric acid streams pass through line 74 and thence into the crystallizer 77. The acid stream is sprayed into an organic liquid spacer, which also serves as the autorefrigerant, comprising propane and isobutane. Make-up propane and isobutane are introduced into the crystallizer as needed to replace the quantity leaving the crystallizer as a vapor through line 80 and as slurry through line 87. The concentration of propane in this liquid varies with the temperature maintained in the crystallizer 77. The crystallizer 77 contains a stirring mechanism 78 illustrated as a vertical shaft containing propellers 79. The purpose of the stirring mechanism is to maintain the crystallization medium in a turbulent state of agitation to prevent stratification or separation of the spacer from the mother liquor. The temperature in the crystallizer is maintained at −35° F. and at a pressure of 5 inches of water. As a result of these conditions, a portion of the spacer is vaporized, consequently cooling the crystallization medium. The vaporized spacer is discharged from the top of the crystallizer 77 by means of line 80. It should be noted that one of the propellers of the stirring mechanism 78 is positioned within the bottom part of conical section 82 of the crystallizer in order to prevent bridging or plugging of the effluent material due to agglomeration of the sulfuric acid crystals. The sulfuric acid crystals present in the spacer and mother liquor tend to agglomerate due to the highly viscous nature of the mother liquor. A slurry of spacer, crystals and mother liquor is withdrawn from the bottom of conical section 82 by means of line 83, and it is transported by means of pump 84.

The pumped slurry is passed through line 85 at a velocity between 10 and 30 feet per second or 8500 B. P. D., and this stream is divided such that a portion is recycled to the crystallizer by means of line 86. In this regard, the volume of slurry recycled to the crystallizer relative to the volume of spent acid which is processed to the crystallizer by means of line 74, stands in the ratio of about 50 to about 500 parts of slurry per part of acid feed. The recycling of slurry serves two purposes, namely, it assists in creating a turbulent state in the crystallizer, and also it serves to "seed" or initiate crystallization of the incoming sulfuric acid. The remaining portion of slurry which is passing through line 85 is passed through line 87. With a cyclic centrifuge, the slurry is charged to the centrifuge at a demand flow rate of about 1 to 2 gallons per second for a controlled time interval. At this time, approximately 25% is flowing to the centrifuge and 75% returned to the crystallizer. At other times, all the slurry returns to the crystallizer. It is important to note that the slurry of acid crystals, mother liquor and spacer should flow through lines 85, 86 and 87 at a linear velocity in excess of 15 feet per second, otherwise there is a tendency for the acid crystals to agglomerate and thus plug these lines. In this example, the linear velocity of material in lines 85, 86 and 87 is 30 feet per second.

The net production of acid crystals passing through line 87 is passed to a centrifugal filter shown schematically as 90. This filter is of well-known design and it comprises essentially a rotating drum 92 upon which the acid crystals are deposited as a cake, and the filtrate passes to the interior thereof for subsequent discharge from the filter. This filter can be of the continuous loading, continuous wash and continuous discharge type, or can be of the interval timed load, wash, dry and unload type. During the course of its operation, wash liquor is contacted with the cake of acid crystals and thereby serves to remove any sorbed or occluded impurities from the crystal cake. With respect to the drawing, the wash liquor is of the same composition as the auto-refrigerant, and it is fed to the centrifugal filter by means of line 91 at the rate of 0.1 to 1.0 gallon per second. The wash liquor has a temperature of −35° F. The filtrate from the centrifugal filter 90 is discharged therefrom by means of line 93, and this material is passed to a separator 94 wherein the hydrocarbon material, namely, propane-isobutane, is discharged overhead by means of line 95 and the mother liquor is discharged from the bottom thereof by means of line 96. In this operation, 20 B. P. D. of mother liquor are produced. The mother liquor at this stage of the operation is at a temperature of −35° F. The mother liquor is passed from line 96 to a holding or settling vessel or zone 97 equipped with a heating coil 98. The mother liquor has a residence time of 30 minutes within the settler 97, and the temperature within the settler is maintained at 50° F. It should be understood, however, that the settling time or residence time of the mother liquor in settler 97 can range from about 1 to about 5000 minutes and the temperature can vary from about 0 to about 150° F. As a result of the conditions prevailing in settler 97, a supernatant phase or layer of hydrocarbon material is formed, and this material is the non-polar impurity which, by analysis, is found to be an alkylate product. The alkylate product is discharged from the settler 97 by means of line 100 at the rate of 20 B. P. D. Initially, the mother liquor being fed to the settler 97 has an acidity of 70%. By virtue of the separation in settler 97, the resultant acid phase has a titratable acidity of 94% or a free acidity of about 90%. The acid of increased concentration is discharged from the bottom of settler 97 by means of line 102. A portion of the acid in line 102 is discharged from the system by means of line 103 and the remaining porton of acid passing through line 102 flows into line 104 and thence, by means of pump 105, it is recycled to the crystallizer by means of line 73, previously mentioned. It is important to note at this point that the temperature condition within settler 97 should be sufficiently high to avoid the formation of crystals therein, otherwise difficulties may occur in the handling of the acid for recycle to the crystallizer. Further, the temperature is preferably below about 150° F., because there may be a tendency for the acid to decompose at higher temperatures, and therefore, increase the loss of acid through evolution of sulfur oxides and water.

The spacer material which is discharged from separator 94 is passed to a collection zone or decanter or holding vessel 108. The collector 108 serves as a means for collecting all of the spacer streams both vapor and liquid which are discharged from the various pieces of apparatus in the process, and thereby a fairly uniform composition of organic liquid spacer is employed in various stages of the operation.

The acid crystals which are separated from the slurry by means of centrifugal filter 90 are discharged by means of conduit 110 into a melting zone or melter 111. The temperature in the melter is maintained at 50° F. by removing or discharging melted or liquid sulfuric acid from the bottom thereof by means of line 113 and transporting the same by means of pump 114 and line 115 to a heat exchanger 116. In the heat exchanger, the liquid sulfuric acid of about 100% total acidity is heated from a temperature of 50° F. to about 70° F. The heated sulfuric acid is discharged from heat exchanger 116 by means of line 117 and a portion thereof, namely, about 1200 B. P. D. is recycled to the melter 111 by means of line 120. The remaining portion of sulfuric acid is discharged from line 117 to line 121, and this material is transported to line 21, whereby it is subsequently utilized in the alkylation reactor. Any organic liquid spacer which is vaporized within melter 111 or centrifugal filter 90 is discharged therefrom by means of lines 123 and 124, respectively.

The vaporized organic liquid spacer in lines 80, 123 and 124 is passed into a header 126 which is connected to the top of collector 108. The composition of the organic liquid spacer is maintained relatively constant by supplying thereto isobutane and propane at a constant rate. This is accomplished by passing a portion of the condensed hydrocarbon from the auto-refrigerant system of the alkylation reactor to the collector 108. The condensed hydrocarbon contains propane and isobutane and this material is passed from the bottom of surge drum 44 by means of line 46 such that a portion is subjected to separation treatment in the depropanizer mentioned hereinabove and the remaining portion, namely, containing 80 to 90% by volume of butane is passed through line 128 and thereby enters the top of collector 108. In order to supply heat for melter 111 wherein acid crystals are melted to the liquid form, the propane vapor stream of the depropanizer is passed through line 54 and enters heat exchanger 116 for indirect exchange of heat therein. The vaporous propane stream having a temperature of 110° F. is reduced in temperature to 105° F. and thereby totally liquefied. The cooled or liquefied propane stream passes from heat exchanger 116 and enters line 130, and thence this material is passed to collector 108 by means of line 131. Thus the maximum temperature in this condenser exchanger 116 is held below serious corrosion range and use of alloy material is avoided.

Steam, water or other heating media could be used, but danger from contamination in the event of leakage is serious and should be avoided. Liquefied propane which is produced in the depropanizer column and is passed through line 62 enters the top of collector 108 by means of line 131. Any vaporized hydrocarbon present within collector 108 is discharged overhead therefrom by means of line 135 and this material is passed to the auto-refrigeration system of the alkylation reactor. In this respect, the vaporized stream in line 135 combines with the vaporized hydrocarbon in line 38 prior to being compressed by means of compressor 40. Organic liquid spacer is withdrawn from collector 108 by means of line 140, and this material is transported by means of pump 141 and line 142 such that a portion is passed through lines 143, 75 and 74 and is utilized as spacer and auto-refrigerant in the crystallizer 77 and the remaining portion is passed through line 91 for the purpose of washing the acid crystals which are present as a cake on the rotating drum 92 of the centrifugal filter 90. A slip stream of spacer material passes from line 142 to line 143 and it is recycled to the alkylation reactor whereafter contaminants are removed.

In view of the highly viscous nature of the mother liquor and the possibility of agglomerating crystals upon withdrawal thereof from the crystallizer, alternative schemes are proposed to counteract such an occurrence. With regard to the drawing, in place of discharging a slurry of crystals from the bottom of the conical section of crystallizer 77 by means of line 83, it is proposed withdrawing the slurry from the side of crystallizer 77 near the juncture of the conical section with the cylindrical body portion, and in place of recycling slurry through line 86 near the top of the cylindrical body, it is recycled to the bottom of the conical section. Another alternative scheme which is particularly adapted for handling extremely viscous slurries of acid crystals involves passing the slurry from the side of a flat bottomed crystallizer near the bottom thereof to an enlarged conduit which is in a horizontal position. The enlarged conduit leads to the inlet of a pump, for example, a centrifugal pump from which the slurry is transported in the manner shown in the drawing.

Having thus provided a written description of my invention along with a specific example thereof, it should be understood that no undue limitations or restrictions are to be imposed by reason thereof, but that the scope of the invention is defined by the appended claims.

I claim:

1. In a process wherein sulfuric acid containing a non-polar impurity is subjected to a crystallization temperature to produce sulfuric acid crystals and mother liquor and wherein said crystals are separated from the mother liquor, the improvement which comprises allowing the mother liquor to settle until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and separating sulfuric acid crystals thus formed from said portion of the acid layer.

2. In a process wherein sulfuric acid containing a non-polar impurity is subjected to a crystallization temperature in the presence of a liquid spacer to produce sulfuric acid crystals and mother liquor and wherein mother liquor is separated from acid crystals and spacer, the improvement which comprises allowing the mother liquor to settle until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and recycling at least a portion of the acid layer of increased acid concentration to the crystallization zone.

3. In a process wherein sulfuric acid containing a non-polar impurity is subjected to a crystallization temperature to produce sulfuric acid crystals and mother liquor and wherein said crystals are separated from the mother liquor, the improvement which comprises allowing the mother liquor to settle until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and recycling at least a portion of the acid layer of increased acid concentration to the crystallization zone at a recycle ratio of about 10 to about 1000:1.

4. In a process wherein sulfuric acid containing a non-polar impurity is subjected to a crystallization temperature in the presence of a liquid spacer to produce sulfuric acid crystals and mother liquor and wherein mother liquor is separated from said crystals and spacer, the improvement which comprises allowing the mother liquor to settle at a temperature of about 0° F. to about 150° F. for a period of about 1 to about 5000 minutes until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and recycling at least a portion of the acid layer of increased acid concentration to the crystallization zone at a recycle ratio of about 10 to about 1000:1.

5. In an alkylation process wherein an olefin and an isoparaffin are reacted in the presence of sulfuric acid and wherein the sulfuric acid containing a non-polar impurity comprising alkylation product is subjected to a crystallization temperature to produce sulfuric acid crystals and mother liquor and wherein said crystals are separated from the mother liquor, the improvement which comprises allowing the mother liquor to settle until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and separating sulfuric acid crystals thus formed from said portion of the acid layer.

6. In an alkylation process wherein an olefin and an isoparaffin are reacted in the presence of sulfuric acid and wherein the sulfuric acid containing a non-polar impurity comprising alkylation product is subjected to a crystallization temperature to produce sulfuric acid crystals and mother liquor and wherein said crystals are separated from the mother liquor, the improvement which comprises allowing the mother liquor to settle until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and recovering at least a portion of the layer of non-polar material as a product of the process.

7. In a process wherein sulfuric acid containing a non-polar impurity is subjected to a crystallization temperature to produce sulfuric acid crystals and mother liquor and wherein said crystals are separated from the mother liquor, the improvement which comprises allowing the mother liquor to settle at a temperature of about 0° F. to about 150° F. until a layer of non-polar material and a sulfuric acid layer of increased acid concentration relative to the mother liquor prior to settling are produced, subjecting at least a portion of the said layer of increased acid concentration to a crystallization temperature for further production of sulfuric acid crystals, and separating sulfuric acid crystals thus formed from said portion of the acid layer.

8. In a process wherein sulfuric acid containing a non-polar impurity is subjected to a crystallization temperature to produce sulfuric acid crystals and mother liquor and wherein said crystals are separated from the mother liquor, the improvement which comprises allowing the mother liquor to settle at a temperature of about 30° F. to about 70° F. until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and separating sulfuric acid crystals thus formed from said portion of the acid layer.

9. In a process wherein sulfuric acid containing a non-polar impurity is subjected to a crystallization temperature to produce sulfuric acid crystals and mother liquor and wherein said crystals are separated from the mother liquor, the improvement which comprises allowing the mother liquor to settle at a temperature of about 0° F. to about 150° F. and for a period of about 1 to about 5000 minutes until a layer of non-polar material and a sulfuric acid layer of increased acid concentration relative to the mother liquor prior to settling are produced, subjecting at least a portion of the acid layer of increased acid concentration to a crystallization temperature for further production of sulfuric acid crystals, and separating sulfuric acid crystals thus formed from said portion of the acid layer.

References Cited in the file of this patent

UNITED STATES PATENTS

| | | |
|---|---|---|
| 2,254,788 | Ballard | Sept. 2, 1941 |
| 2,593,128 | Felter | Apr. 15, 1952 |
| 2,716,592 | Skelly et al. | Aug. 30, 1955 |

FOREIGN PATENTS

| | | |
|---|---|---|
| 96 | Great Britain | Jan. 8, 1883 |